United States Patent [19]

Smith

[11] Patent Number: 4,589,372
[45] Date of Patent: May 20, 1986

[54] DISPENSING SYSTEM HAVING WEIGHT DEPENDENT CONTROL MEANS

[75] Inventor: Clifford J. Smith, Toledo, Ohio

[73] Assignee: The University of Toledo, Toledo, Ohio

[21] Appl. No.: 707,523

[22] Filed: Mar. 4, 1985

Related U.S. Application Data

[63] Continuation of Ser. No. 483,835, Apr. 11, 1983, abandoned.

[51] Int. Cl.⁴ .................. A01K 5/02; A61M 31/00
[52] U.S. Cl. .................. 119/51 R; 119/55; 604/66
[58] Field of Search .............. 119/51 R, 51.11, 55, 119/52 AF; 222/56; 604/31, 66, 67

[56] References Cited

U.S. PATENT DOCUMENTS

| | | | |
|---|---|---|---|
| 3,228,397 | 1/1966 | Moss | 604/66 |
| 3,301,219 | 1/1967 | Hellekson | 119/55 |
| 3,303,823 | 2/1967 | Cohen | 119/51.11 |
| 3,656,478 | 4/1972 | Swersey | 222/56 |
| 4,081,044 | 3/1978 | Allen | 222/56 X |
| 4,308,866 | 1/1982 | Jelliffe et al. | 604/31 |

Primary Examiner—Robert P. Swiatek
Attorney, Agent, or Firm—David D. Murray

[57] ABSTRACT

The present invention relates to a dispensing system for supplying and administering a metered dose of a material to an animal subject wherein the amount of the material supplied is a function of the weight of the subject. The delivery system includes a scale for determining the weight of the subject and for generating a weight control signal representing the weight of the subject. A microcomputer is responsive to the weight control signal and a preprogrammed weight conversion factor for generating a delivery control signal to a delivery unit. The delivery unit is responsive to the delivery control signal for supplying a predetermined amount of the material to the subject. The predetermined amount represents an amount which is a function of the weight of the subject of the weight conversion factor.

6 Claims, 1 Drawing Figure

DISPENSING SYSTEM HAVING WEIGHT DEPENDENT CONTROL MEANS

This is a continuation of Ser. No. 483,835, filed 4/11/83, now abandoned.

BACKGROUND OF THE INVENTION

The present invention relates generally to a delivery system which is adapted to dispense a predetermined amount of material and, in particular, to a delivery system in which the amount of material dispensed is a function of the weight of an associated subject.

It is often desired to control the amount of a material supplied to a subject such as a human being or an animal based on the weight of the subject. Generally, this requires that the subject must be weighed, and then the amount to be supplied to the subject must be calculated based on the subject's weight and any weight conversion factors. Once this amount has been calculated, a delivery device, such as a syringe, can be filled with the desired amount and then either supplied orally or injected into the subject. Such a procedure can be relatively time consuming, especially when the number of subjects to be dosed is relatively large, as is often the case in laboratory situations.

An automatic dispensing system is available from the Hamilton Company of Reno, Nevada. This dispensing system includes a programmable microprocessor control which is adapted to control a delivery device connected to a supply of the material to be dispensed. The control automatically dispenses a predetermined amount of the material in accordance with parameters programmed into the unit by the operator. While such a system eliminates the need for measuring the individual dosages to be dispensed, an operator is still required to calculate the amount of each dosage.

Examples of dispensing systems which are adapted to supply a material to a subject based on the weight of the subject are disclosed in U.S. Pat. Nos. 3,003,823 to Cohen and 3,656,478 to Swersey. The Cohen patent discloses a weight control apparatus for automatically supplying food to an animal in order to maintain the animal at a predetermined weight. When the weight of the animal falls below the predetermined weight, a feeding mechanism is activated to continuously supply food to the animal at a selected rate until the animal reaches the predetermined weight.

The Swersey patent discloses an infusion monitor which is adapted to supply an infusing liquid into a patient at either a high rate of speed or a low rate of speed, depending upon the weight of the patient. For example, with the infusion monitor operating at the normal low speed, if the weight of the patient decreases below a preset value, the infusion monitor is switched to the high speed. When the weight of the patient subsequently returns to the preset value, the infusion monitor switches back to the low speed.

SUMMARY OF THE INVENTION

The present invention relates to a delivery system for supplying and administering a metered dose of a material to an animal subject in which the amount of the material supplied is a function of the weight of the subject. The delivery system includes a scale means for determining the weight of the subject and for generating a weight control signal representing the weight of the subject to a central processing means. An input select means can be provided for enabling an operator to select various system initialization data and operating parameters. For example, the operator can select a weight conversion factor which represents the amount of the material which is to be supplied to the subject per unit weight.

The central processing means is responsive to the weight control signal and the weight conversion factor for generating a delivery control signal. A delivery means is connected to a supply of the material and is responsive to the delivery control signal for supplying a predetermined amount of the material to the subject. The predetermined amount represents an amount which is a function of the weight of the subject and of the weight conversion factor. Such a system provides an effective means for supplying each one of a plurality of subjects with an individually calculated metered amount of a material which amount is based upon the weight of the individual subject.

BRIEF DESCRIPTION OF THE DRAWINGS

The above, as well as other features and advantages of the present invention, will become readily apparent to one skilled in the art from reading the following detailed description in view of the accompanying drawing in which.

DESCRIPTION OF THE PREFERRED EMBODIMENT

Figure 1:
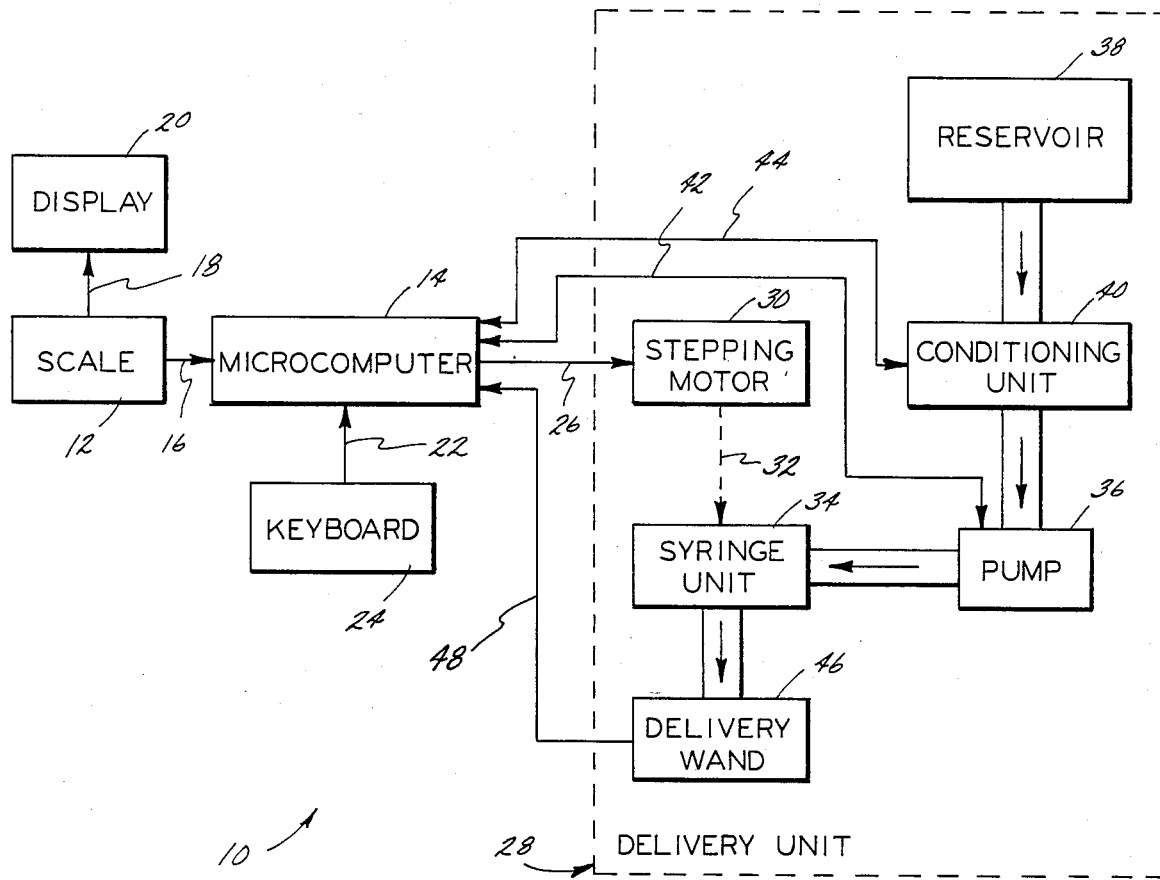
FIG. 1 is a block diagram of a delivery system embodying the principles of the present invention.

Referring to FIG. 1, there is shown in block diagram form a delivery system 10 according to the present invention. The system 10 includes a scale 12 for determining the weight of a subject (not shown) such as an animal or a human being, for example. The scale 12 is adapted to generate a weight control signal representing the weight of the subject to a microcomputer 14 on a line 16. The scale 12 can also generate an output signal on a line 18 to a display 20 which displays the weight of the subject. Any one of a number of commercially available digital electronic scales could be utilized in the delivery system of the present invention.

The microcomputer 14 is connected to receive initialization data and system operating parameters on a line 22 from an input keyboard 24. As will be discussed, such initialization data can include a weight conversion factor which represents the amount of a material per unit weight which is to be supplied to a subject. The microcomputer 14 is responsive to the weight control signal on the line 16 and the initialization data received on the line 22 for generating a delivery control signal on a line 26 to a delivery unit 28. The delivery unit 28 is responsive to the delivery control signal for supplying a predetermined amount of material to the subject.

While it will be appreciated that various types of delivery units can be utilized with the present invention, the delivery unit 28 shown in FIG. 1 includes a stepping motor 30 connected to receive the delivery control signal on the line 26. The stepping motor 30 is coupled (represented by dashed line 32) to control a syringe unit 34. The syringe unit 34 is connected to receive the material to be dispensed from the output of a pump 36. The input of the pump 36 is connected to receive a supply of the material contained in a reservoir 38 through a conditioning unit 40. The conditioning unit 40 can be adapted to cool, heat, stir, or otherwise condition the material before it is supplied to the syringe unit 34 by the pump 36. The pump 36 and the conditioning unit 40 can communicate with the microcomputer by lines 42 and 44, respectively.

The syringe unit 34 has an output connected to supply a predetermined amount of the material to a delivery wand 46. The delivery wand 46 can be adapted to supply the material to the subject by any one of a number of methods such as by injection through a hypodermic needle or orally by a feeding tube, for example. The delivery wand 46 can include integral switches (not shown) which can be connected to communicate with the microcomputer by lines 48. Such switches can include, for example, a "delivery" switch which signals the microcomputer 14 to operate the stepping motor 30 and cause the syringe unit 34 to supply the predetermined amount of material to the subject by means of the delivery wand 46.

In operation, the operator utilizes the keyboard 24 to supply the microcomputer 14 with certain initialization data and operating parameters. Such information can include, for example, the control parameters for the pump 30, the control parameters for the conditioning unit 40, and the weight conversion factor to be utilized in calculating the amount of material to be supplied. Once the reservoir 38 has been filled and the system has been primed, the subject to be dosed can be placed on the scale 12 which then sends the microcomputer 14 a weight control signal on the line 16 representing the weight of the subject.

The microcomputer 14 utilizes this data in combination with the previously programmed weight conversion factor in order to determine the amount of material which is to be dispensed. Thus, the amount of material supplied to the subject is a function of the weight of the subject. Generally, this predetermined amount is calculated by the microcomputer 14 by multiplying the subject's weight times the associated weight conversion factor. Upon receiving the appropriate actuating signal from the delivery wand switch on the line 48, the microcomputer 14 generates the delivery control signal to the stepping motor 30 which in turn activates the syringe unit 34 and supplies the predetermined amount of material to the subject by means of the delivery wand 46.

In accordance with the provisions of the patent statutes, the principle and mode of operation of the invention have been described in what is considered to represent its best embodiment. However, it should be understood that the invention may be practiced otherwise than as specifically illustrated and described without departing from its spirit or scope.

What is claimed is:

1. An apparatus for supplying and administering an individual metered dose of a material proportional to the weight of an individual animal subject being administered to comprising, in combination:
    scale means for determining the weight of such individual subject and providing a weight signal;
    input means for receiving material dose amount per subject weight data;
    first control means responsive to said weight signal and said dose per weight data for generating a delivery control signal;
    delivery means connected to a supply of the material and responsive to said delivery control signal for supplying an individual dose of the material to the subject; and
    second control means for selectively activating said delivery means;
    whereby said individual metered dose represents an amount of material which is related to the weight of such individual subject in accordance with said dose per weight data.

2. An apparatus according to claim 1 wherein said second control means includes a switch means for generating an activating signal.

3. An apparatus for supplying and administering an individual metered dose of a material to an individual animal subject being administered to comprising, in combination:
    scale means for determining the weight of such individual subject;
    input means for receiving material dose amount per subject weight data;
    control means for receiving said weight of such individual subject and said dose amount per weight data and providing a delivery control signal representing the product of said weight and said dose amount per weight data;
    delivery means connected to a supply of the material and responsive to said delivery control signal for supplying an individual metered dose of the material to such individual subject, said individual metered dose representing an amount of material which is related to the weight of such individual subject according to said dose amount per weight data.

4. An apparatus for supplying an individual metered dose of a material to an individual animal subject comprising, in combination:
    scale means for determining the weight of such individual subject and providing a signal representative of said weight;
    input means for accepting material dose amount per subject weight data;
    control means responsive to said weight signal and dose amount per subject weight data for generating a dose amount signal representing the product of said weight and said dose amount per weight data; and
    delivery means connected to a supply of the material and responsive to said dose amount signal for supplying a metered dose of the material to such individual subject, said individual metered dose representing an amount of material related to the weight of such individual subject according to said dose amount per weight data.

5. An apparatus according to claim 4 wherein said scale means include a display means for displaying the weight of the subject.

6. An apparatus according to claim 4 further including second control means for selectively activating said delivery means in response to said dose amount signal.

* * * * *